United States Patent [19]

Giering et al.

[11] Patent Number: 4,773,511
[45] Date of Patent: Sep. 27, 1988

[54] HOLD-DOWN LEAF SPRING FOR THE BRAKE LINING BACKPLATE OF A DISC BRAKE OR FOR THE PRESSURE DISTRIBUTOR PLATE WHICH ABUTS THE BRAKE LINING BACKPLATE

[75] Inventors: Wilfried Giering, Mendig; Alojzija Topic, Koblenz, both of Fed. Rep. of Germany

[73] Assignee: Lucas Industries public limited company, Birmingham, England

[21] Appl. No.: 53,719

[22] Filed: May 26, 1987

[30] Foreign Application Priority Data

Jun. 4, 1986 [DE] Fed. Rep. of Germany ....... 8615015

[51] Int. Cl.$^4$ .............................................. F16D 65/02
[52] U.S. Cl. ................................ 188/73.38; 188/73.1; 188/250 R; 267/158; 267/47
[58] Field of Search ............... 188/73.38, 73.37, 73.36, 188/73.35, 205 A, 73.31, 250 E, 250 R, 250 G, 73.32, 73.1, 73.2, 250, 217; 192/30 V, 107; 267/158-165, 36.1, 47

[56] References Cited

U.S. PATENT DOCUMENTS

| | | | |
|---|---|---|---|
| 4,049,087 | 9/1977 | Heinz et al. ...................... | 188/73.38 |
| 4,055,238 | 10/1977 | Haraikawa et al. .............. | 188/73.37 |
| 4,061,209 | 12/1977 | Gee et al. ......................... | 188/73.36 |
| 4,576,257 | 3/1986 | Carré et al. ....................... | 188/73.32 |
| 4,577,731 | 3/1986 | Burgdorf et al. ............. | 188/73.36 X |

FOREIGN PATENT DOCUMENTS

| | | | |
|---|---|---|---|
| 1750769 | 4/1971 | Fed. Rep. of Germany . | |
| 3402866 | 9/1984 | Fed. Rep. of Germany ... | 188/73.36 |
| 2461161 | 3/1981 | France .............................. | 188/73.38 |
| 2017237 | 10/1979 | United Kingdom ............. | 188/73.38 |

*Primary Examiner*—Douglas C. Butler
*Attorney, Agent, or Firm*—Scrivener and Clarke

[57] ABSTRACT

A leaf spring (76) for holding down the pad backplate (72) and the pressure distributor plate, if any, in the pad opening of a disc brake at one side rests on a movable frame (12) of the brake and at the other side pressurizes the lining backplate and the pressure distributor plate, if any. The leaf spring (76) is designed such that, in relaxed condition, it has an arched center portion (106) which is followed at either end by an at least approximately straight side portion (108,108') the end portions (84,84') of which are fixed at the lining backplate and pressure distributor plate, respectively, in the direction of extension of the leaf spring. This is to assure reliable hold-down even at great accelerations in spite of the fact that the brake linings remain easy to be applied and released. Such a leaf spring provides a favorable hold-down characteristic for the lining backplate and the pressure distributor plate without impeding the venting of the brake.

4 Claims, 6 Drawing Sheets

HOLD-DOWN LEAF SPRING FOR THE BRAKE LINING BACKPLATE OF A DISC BRAKE OR FOR THE PRESSURE DISTRIBUTOR PLATE WHICH ABUTS THE BRAKE LINING BACKPLATE

The instant invention relates to a leaf spring for holding down the pad backplates and the pressure distributor plate, if any, in the pad opening of a disc brake, which leaf spring at one side rests on a movable frame or a stationary carrier member of the brake and at the other side presses against the lining backplate and the pressure distributor plate, if any.

The term disc brake is to be understood very broadly in the context of the instant invention and comprises conventional floating caliper spot-type disc brakes as well as disc brakes with which the friction linings at either side of the brake disc are actuated by separate piston and cylinder assemblies (fixed caliper brake). Furthermore, the invention relates to disc brakes both for passenger cars and heavy commercial vehicles.

With the disc brakes mentioned the friction lining which is to be pressed against the brake disc typically is attached to so-called backplates. The unit composed of the friction lining and the backplate is referred to as a "brake pad".

The backplates are supported in pad openings and guided for movement perpendicularly with respect to the plane of the disc. It is unavoidable that there is clearance between the backplates and the guide faces of the pad opening. This clearance is caused by the necessary manufacturing tolerances of the components and also due to the required easy movement of the backplates in applying the brakes.

As a consequence of the required clearance between the backplates of the brake pads and the guide faces of the lining shaft, the backplates hit the guide faces with great impact (a strong impulse) when the vehicle travels over a dent or hump in the ground. Since the brake is not springsuspended, any accelerations of the axles of the vehicle occurring during rough running, in other words accelerations which mainly are directed vertically with respect to the level of the ground, are transmitted fully to the brake components.

The hammer-like beating of the pad backplates against the guide faces in the pad opening not only gives rise to annoying noise but may also lead to serious damage of the guide faces whereby the smooth sliding of the backplates on these guide faces is impeded. Moreover, damage done to the guide faces by backplates hitting the same at great velocity also may result in the backplate getting stuck, upon brake application, at the damaged location of the guide face. This disturbs the parallel character between the working surface of the friction lining and the brake disc (the brake lining becomes slightly tilted), and that may give rise to uneven wear when the friction lining is pressed against the brake disc. Such one-sided wear of the friction linings is highly undesirable.

In the case of large-area brake linings, such as used particularly in heavy commercial vehicles, a so-called pressure distributor plate is arranged between a plunger and the backplate for better distribution of the brake load transmitted by the plunger or piston to the backplate. The dimensions of the pressure distributor plate are substantially the same as those of the backplates, yet it is much thicker than the same (typically about 2 to 3 times as thick). Just like the backplate, the pressure distributor plate is guided and supported at the guide faces of the lining shaft. Because of its greater volume, the pressure distributor plate beats against the guide faces with even greater impact so that the disadvantages mentioned above are aggravated. In order to avoid the hard beating of the backplates and of the pressure distributor plate against the guide faces the fixed and movable components are spring loaded. It is also known (DE-PS No. 17 50 769) to use leaf springs for this purpose.

In selecting the springs to press the backplates and any pressure distributor plates which may be provided against the guide faces of the lining shaft, contradictory demands must be met. On the one hand, the spring pressure is to be as great as possible so that any acceleration occurring in operation can be accommodated. To accomplish that, the spring will have to supply a supporting force of approximately 75 kp (kilopond) if the mass of the pressure distributor plate is assumed to be 2.5 kg and the acceleration approximately 300 m/sec$^2$. A total force of more than 200 kp would result if the spring in addition were to absorb the shock of the two brake linings.

The demand for a strong spring to absorb the highly accelerated backplates and pressure distributor plates is opposed by the demand that the plates must be readily displaceable within the lining shaft. If the coefficient of friction is assumed to be 0.3, the elastic force of 200 kp calculated above results in a force for displacement of the backplate and of the pressure distributor plate of approximately 60 kp, and this would be highly disadvantageous. As explained above, the backplates and pressure distributor plates must be movable very easily along the guide faces in the lining shaft in order to keep oblique wear of the friction linings at a minimum and, on the other hand, make sure that upon release of the brake (ceasing of the clamping force) the brake linings are reliably removed from the brake disc. If the brake linings should not be fully retracted from the brake disc and continue to be pressed against the same at a residual force of approximately 60 kp, they will rub on the brake disc and this reduces the lifetime of the friction lining and, moreover, is a waste of drive energy of the vehicle. The constant rubbing of the friction linings on the brake disc also may lead to permanent heating of parts of the vehicle, including wheel bearings and tires.

It is, therefore, an object of the invention to design a hold-down leaf spring for the pad backplates and the pressure distributor plate, if any, in the pad opening of a disc brake such that the pads will be held down reliably, even at great accelerations, in spite of being easy to apply and release, and with good venting of the brake being assured.

This object is met, in accordance with the invention, with a leaf spring characterized in that, in relaxed condition, it has a curved center portion which is followed at either end by an approximately straight side portion, both being fixed at their respective end portions at the lining backplate or the pressure distributor plate in the direction of elongation of the leaf spring, and that a free space is defined between the curved center portion of the leaf spring and the lining backplate or pressure distributor plate to be held down.

The leaf spring designed in accordance with the invention balances any manufacturing tolerances and can reliably hold down brake linings and pressure distributor plates upon accelerations of the same of up to 150 m/sec$^2$. The leaf spring acts as a good damper at accelerations of up to approximately 300 m/sec², and at rare accelerations of more than 300 m/sec², the leaf spring cooperates with a fixed abutment in such manner that the guide faces are unlikely to become damaged.

The leaf spring may be very narrow having a width which corresponds to the thickness of the backplate so that the accessibility of the brake for venting does not suffer.

The leaf spring designed in accordance with the invention specifically provides the following advantages:

(a) The characteristic of the spring, i.e. the dependence of the restoring force on the deflection from the relaxed normal position is such that the working point (15 g) on the characteristic lies approximately in the range of the turning point of an S-shaped characteristic. This permits good balancing of manufacturing tolerances and, at the same time, does not require forces to install the spring which are too great or too small.

(b) Above the turning point the characteristic of the leaf spring according to the invention takes such a course that, at extreme forces, the restoring force asymptotically approaches the fixed abutment (at a deflection of 6.5 mm in the embodiment shown) so that their coming into contact is totally damped.

(c) The favorable characteristic of the leaf spring is obtained with small dimensions and a low weight of the spring.

(d) The leaf spring according to the invention is easy to mount manually without requiring any special accessories.

(e) The spring designed in accordance with the invention permits the use of non-corroding stainless spring steel which, although having a lower modulus of elasticity than conventional spring steel, has a favorable characteristic in respect of the deformation provided according to the invention of the side portions of the leaf spring.

The invention will be described further, by way of example, with reference to the accompanying drawings, in which.

Figure 1:
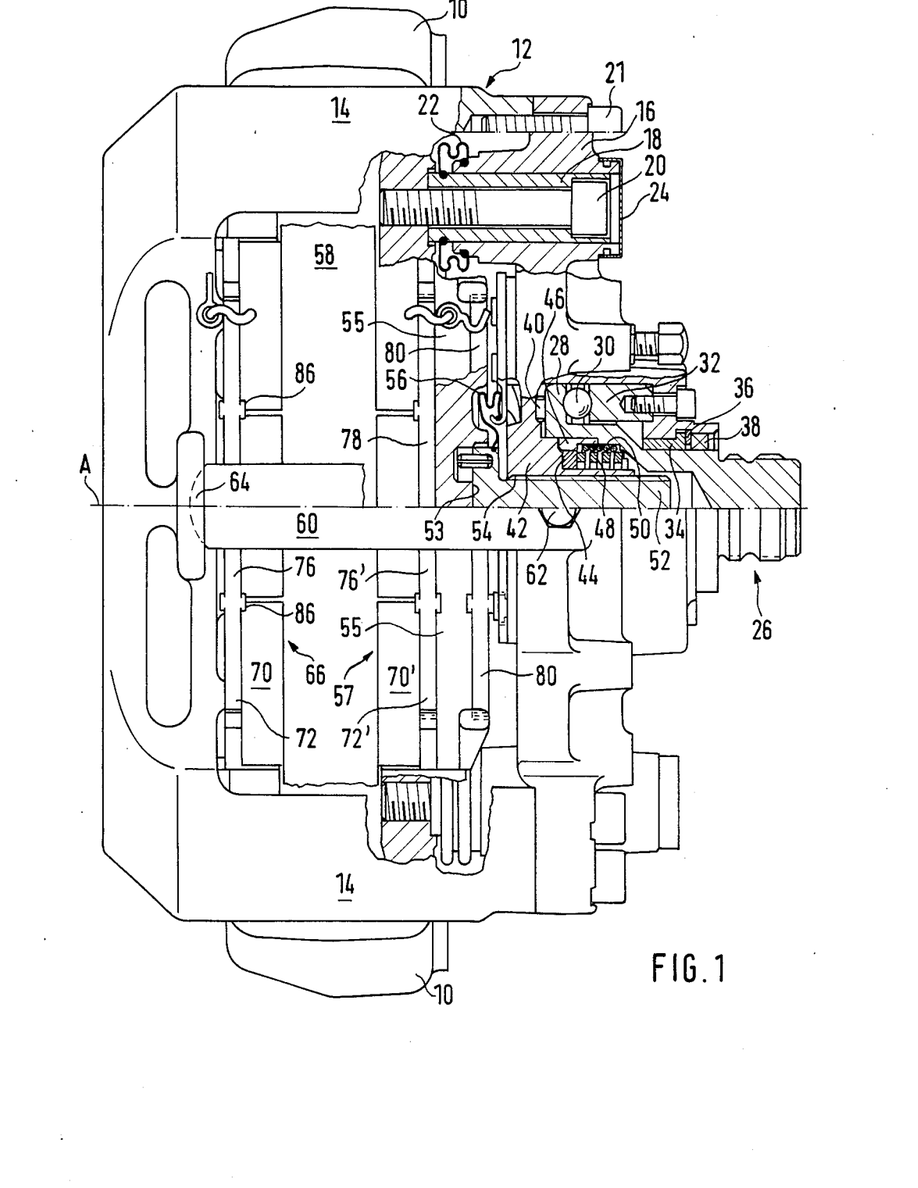
FIG. 1 is a top plan view, partly cut-away, of a floating frame spot-type disc brake in which a leaf spring according to the invention is used.

As shown in FIG. 1, the floating frame spot-type disc brake comprises a stationary carrier member 10 on which a frame 12 (in this case a floating frame) is movably guided. The frame 12 consists of a bridge 14 extending across the brake disc (to be referred to below) and a housing 16. The frame 12 is supported for displacement by means of two guide sleeves 18 which are fixed symmetrically with respect to axis A by means of screws 20 having hexagonal recessed holes. The bridge 14 and the housing 16 are held together by threaded bolts 21. Flexible bellows 22 and caps 24 protect the sliding surfaces of the guide sleeves 18 from dirt and splashing water.

Any adjustment and restoration of the brake as well as the generation of the brake force or brake pressure may be effected in any known manner. In the case of the embodiment shown in FIG. 1, the brake force is generated as follows:

When actuating the brake, a torque is transmitted to serrated shaft 26. By way of a ball bearing 30 this torque rotates the movable incline 28 on the incline 32 which is in screw threaded connection with the casing 16. Both ball inclines 28 and 32 are parts of threads and act like a screw and nut assembly. The balls are inserted between the thread surfaces so as to reduce the thread friction and increase the durability. The incline 28 moves to the left on axis A and, at the same time, presses on adjustment nut 42 through the intermission of needle bearing 40. In this manner the clamping force is transmitted through irreversible thread 54 to plunger 52. Twisting of the adjustment nut 42 on thread 54 of plunger 52 causes adjustment of the brake. A slipping clutch 44, adjustment ring 46, contact pressure 48 and friction springs 50 take care of the automatic adjustment.

Figure 4:
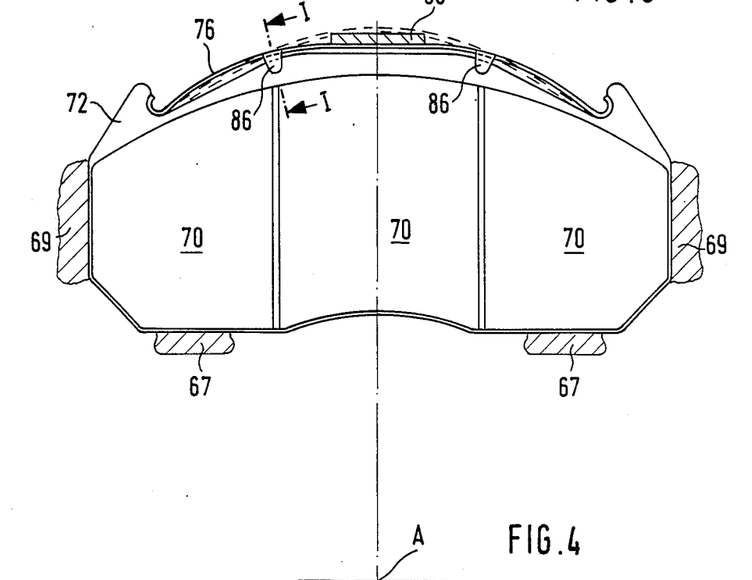
FIG. 4 is a view taken in the direction from the brake disc to a brake lining and the leaf spring according to the invention.
Figure 5:
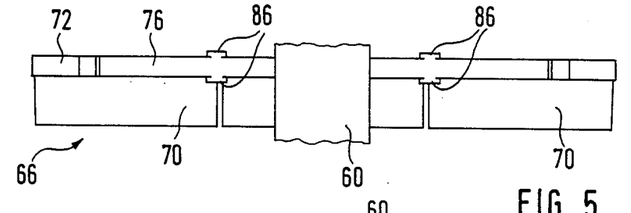
FIG. 5 is a top plan view of the brake lining and the leaf spring shown in FIG. 4.

When the serrated shaft 26 rotates, therefore, a spreading force is generated between the ball inclines 28 and 32, and one part of this force is transmitted to the brake disc 58 by way of needle bearing 40, adjustment nut 42, thread 54, plunger 52, end face 53, and a pressure distributor plate 55 as well as an inner brake pad 57. The other part of the brake load is transmitted through the fixed ball incline 32, casing 16, bolts 21, bridge 14 and an outer brake pad 66 to brake disc 58. The brake pads 57 and 66 are supported at both sides of the brake disc 58 by guide faces 67, 69 (FIG. 4). The guide faces 67, 69 belong to carrier member 10. The brake pads 57, 66 each comprise a friction lining 70, 70' and a backplate 72, 72'. The outer brake pad 66 is pressed uniformly and over a large surface area by bridge 14 against brake disc 58. Since the brake applying pressure coming from plunger 52 is introduced into the inner backplate 72' across the rather small end face 53 only, a pressure distributor plate 55 is positioned between the plunger 52 and the backplate 72' of the inner brake pad 57. This pressure distributor plate 55 makes sure that the force is distributed uniformly to backplate 72'.

The serrated shaft 26 is supported in the casing 16 by a flange bushing 34 which is retained in axial direction by a circlip 36. A radial shaft seal 38 and a flexible bellows 56 serve to protect the actuating members and the components serving for adjustment and restoration.

Figure 2:
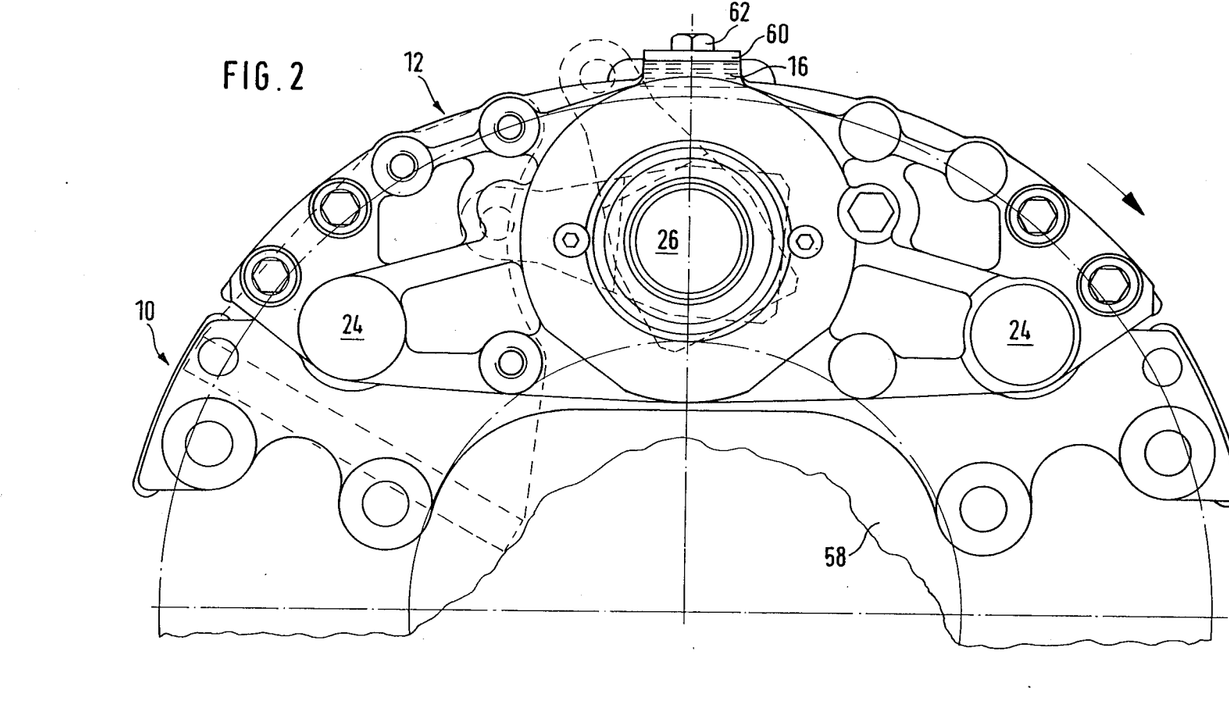
FIG. 2 is a front elevation of the brake shown in FIG. 1.

FIG. 2 is a front elevation of the brake. As shown in the drawing, a retaining member 60 is fixed to the casing 16 by a screw 62. The function of this retaining member 60 will be described in greater detail below.

Figure 3:
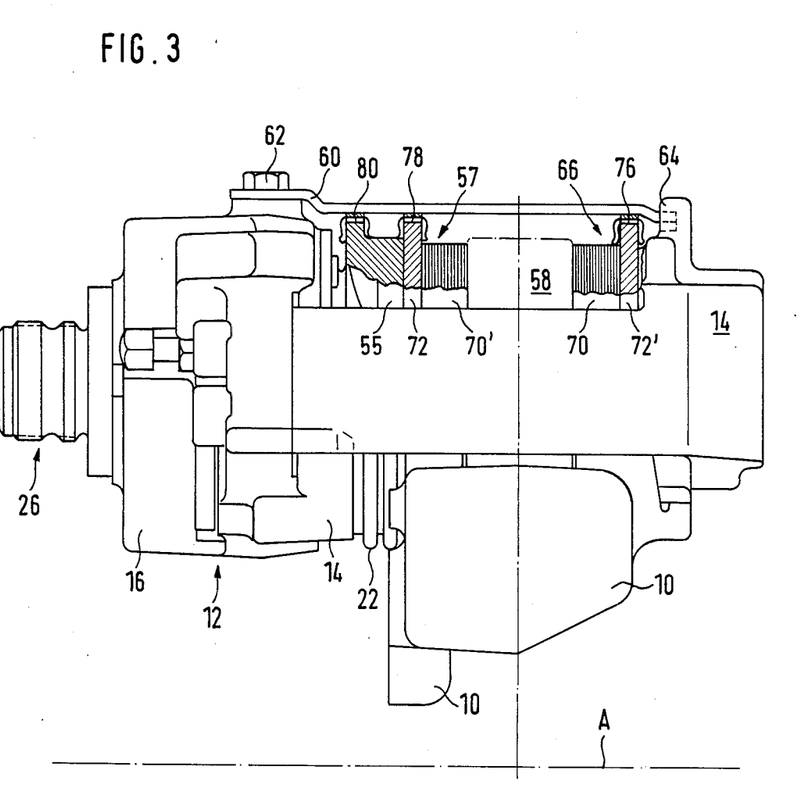
FIG. 3 is a side elevation of the brake shown in FIGS. 1 and 2 in which the leaf spring according to the invention as well as the brake linings and the pressure distributor plate are shown partly in section.

As shown in FIG. 3, the retaining member 60 extends across the pressure distributor plate 55, backplate 72, brake disc 58 as well as the outer backplate 72. The bridge 14 is provided with a recess 64 at the outer side of the brake for engagement of the retaining member 60.

As the friction linings 70, 70' wear down, frame 12 moves to the left, as seen in FIG. 3, taking along the outer brake pad 66. Consequently the outer brake pad 66 does not change its position with respect to the retaining member 60 The inner brake pad 75, on the other hand, and the pressure distributor plate 55 are displaced to the right with respect to the retaining member 60.

It may be gathered from FIG. 4 that each brake pad 66 and 57 as well as the pressure distributor plate 55 are supported radially inwardly on the guide face 67. In circumferential direction the brake forces are taken by one or the other of the guide faces 69, depending on the direction. The brake pads 66, 57 and the pressure distributor plate 55 are supported radially outwardly on retaining member 60 by the leaf springs 76, 78, and 80, respectively. The leaf springs 78 and 80 (in the case of a fixed caliper brake also leaf spring 76) must slide slightly along the retaining member 60 For this purpose they are formed with lugs 86 (FIG. 6) which grasp over the backplates 72, 72' and the pressure distributor plate 55 for fastening purposes.

In the embodiment shown, the leaf springs 76, 78, 80 used for the two backplates 72, 72' and the pressure distributor plate 55 are identical.

The backplate 72 is formed with recesses 82, 82' which are symmetrical with respect to the center line 98 which is the direction in which force F is acting. The end portions 84, 84' of the leaf spring 76 are bent radially outwardly in semicircles and fit exactly into depressions 82, 82'.

Figure 7:
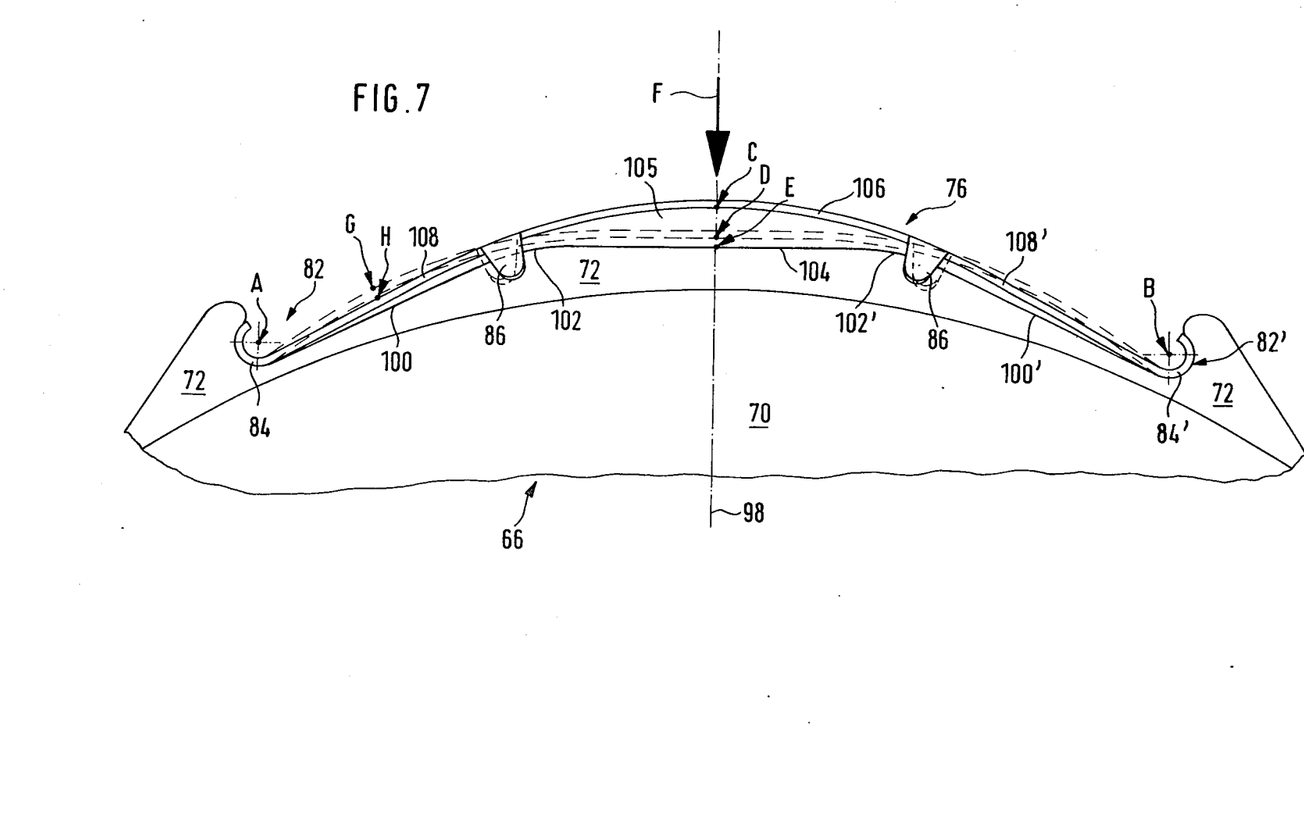
FIG. 7 is an enlarged view of the leaf spring mounted on the lining backplate, showing the relaxed condition in continuous lines and the stressed condition in discontinuous lines.

FIG. 7 is a more detailed presentation of leaf spring 76 also shown in FIG. 4. Other than in FIG. 4, the continuous lines show the slightly stressed condition of leaf spring 76, which results upon introduction of the end portions 84, 84' in the depressions 82, 82'. Upon mounting of the brake, the retaining member 60 presses leaf spring 76 into the position shown in discontinuous lines in FIG. 7 (this is the position shown in continuous lines in FIG. 4). Point C of leaf spring 76 has become displaced to position D upon assembly of the brake without any acceleration forces acting on the backplate.

Thus leaf spring 76, when assembled, adopts an inoperative position which is shown in discontinuous lines in FIG. 7. The side portions 108, 108' of leaf spring 76 which are straight in the totally relaxed condition have become slightly arched outwardly in the condition illustrated in FIG. 7, point H having become displaced to position G.

The leaf spring 76 includes a center portion 106 as well as the side portions 108, 108' at either end thereof. In the relaxed condition, the center portion 106 is curved approximately into circular arc shape, whereas the side portions 108, 108' are at least approximately straight in the relaxed condition. The leaf spring 76 is guided reliably on backplate 72 by the clamping fit of the end portions 84, 84' in the depressions 82, 82' and by the lugs 86.

The backplate 72 has a straight upper edge 104 in the area of the center portion 106 of the leaf spring 76. In this manner a free space 105 is defined between the relaxed leaf spring and the upper edge 104 of backplate 72, and the center portion 106 of the leaf spring may become deformed into this space under load.

In the area of the side portions 108, 108' the adjacent upper edges 100, 100' of the backplate 72 are substantially rectilinear. The transitional areas 102, 102' between the upper edges mentioned of the backplate 72 are rounded.

Figure 6:
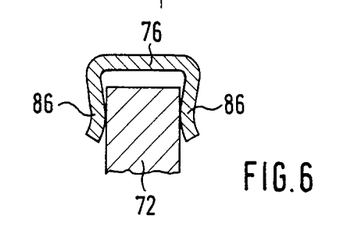
FIG. 6 is a sectional elevation along line I—I in FIG. 4.

To mount the leaf spring 76, first one end portion 84' is inserted into the recess 82', e.g. at point B. Then the leaf spring 76 is bowed slightly outwardly by slightly lifting it at point C. Then the other end portion 84 of the leaf spring can be pressed into the recess 82 by minor thumb pressure. The lugs 86 are in engagement with the side walls of backplate 72 under small bias. As shown in FIG. 6, the lugs 86 are formed at each end with a small outward bend which makes it easy to slip them onto the backplate 72.

The position of leaf spring 76 shown in continuous lines in FIG. 7 is the position corresponding to a slightly stressed condition of leaf spring 76 which results upon insertion of the outwardly curved end portions 84, 84' into the depressions 82, 82'. When the retaining member 60 is tightened in assembling the brake, an increasing force F is applied on the leaf spring 76 so that it will adopt the position shown in discontinuous lines when the retaining strap 60 is fully tightened. When this position is reached, point C of leaf spring 76 has moved to position D. The arching of the side portions 108, 108' of the leaf spring which at first were straight in the relaxed condition is caused by the fact that the total length of the leaf spring between points A and B is constant. In this inoperative position of the brake the leaf spring 76 presses the backplate 72 so vigorously against the guide faces 67 (FIG. 4) that forces acting on the backplate corresponding to an acceleration of 150 m/sec$^2$, are accommodated without the backplate moving away from the supporting guide faces 67. Only when the forces become greater and correspond to an acceleration of up to 300 m/sec$^2$, will the backplate 72 move with respect to the leaf spring 76 such that point E of backplate 72 will abut against point D of leaf spring 76.

Figure 8:
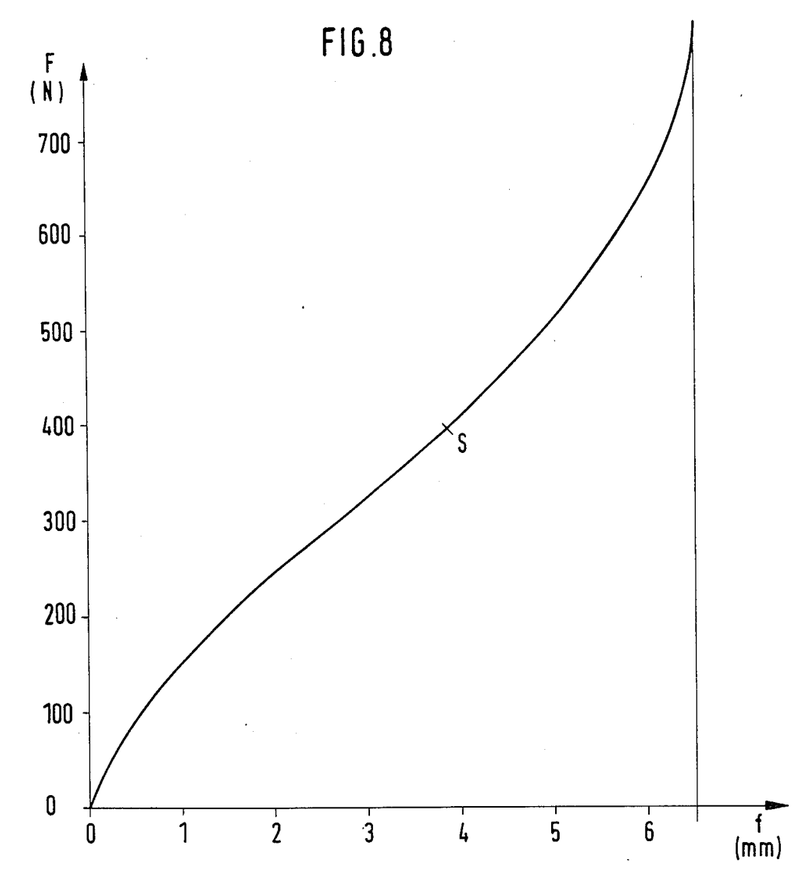
FIG. 8 shows the characteristic of a leaf spring according to the invention.

FIG. 8 shows the force F in response to the deflection f of point C of the leaf spring 76. The working point of leaf spring 76 is marked S. The working point S of the leaf spring 76 according to FIG. 8 corresponds to the position of point D in FIG. 7. In this position the brake is in the normal built-in condition without being subjected to any greater accelerations. The working point S corresponds to a turning point of the characteristic. In FIG. 8 the working range of the leaf spring 76 is located at the right side above working point S. As may be taken from the course of the curve shown in FIG. 8, the restoring force of the leaf spring at first rises moderately and then increases at increasing gradient as the deflections become greater. At extreme deflections above 6 mm the characteristic curve asymptotically approaches the abutment at 6.5 mm so that even in case of extremely great accelerations of the brake the backplate 72 (and in the same manner the other backplate 72' as well as the pressure distributor plate 55) cannot hit hard against the guide faces 67 (FIG. 4). At the point of abutment at 6.5 mm in FIG. 8 point E of the backplate 72 has moved up to point D of the leaf spring 76.

Part of the oscillation energy is dissipated by the friction of the lugs 86 on the sidewalls of the backplate 72 (and the pressure distributor plate 55, respectively).

What is claimed is:

1. A backplate for a friction lining of a disc brake, said backplate having front and rear faces, one of which carries the friction lining, and an edge intermediate said faces, in combination therewith a leaf spring having inner and outer faces, said inner face being adjacent said edge of said backplate, said leaf spring, in its relaxed condition having a curved center portion followed at either end by a relatively sloping straight side portion, the end parts of said side portions being curved away from the edge of said pad backplate, said pad backplate having formed therein recesses complementary in shape to said curved end parts and receiving said end parts therein, the edge of the pad backplate adjacent the straight portions of said spring in relaxed condition following generally the slope of said straight portions, the edge of said pad backplate adjacent the curved center portion of the leaf spring being straight to define a free space between said curved center portion and said edge of said pad backplate said spring being constructed and arranged that when extremely stressed in the direction of said pad backplate edge the center portion of said spring is straightened and said side portions are bowed, said leaf spring being formed at the transitional range between said center portion which is curved in relaxed condition and each of said relatively sloping side portion with two lugs which straddle said pad backplate.

2. The combination of claim 1 including a brake frame, the outer face of said leaf spring being reacted against a retaining member which is fixed to said brake frame and extends parallel to the axis of rotation of a brake disc.

3. A pressure distributor plate for use in a disc brake, said pressure distributor plate having front and rear faces, one of which abuts against a pad backplate, and an edge intermediate said faces, in combination therewith a leaf spring having inner and outer faces said inner face being adjacent said edge of said pressure distributor plate, said leaf spring in its relaxed condition having a curved center portion followed at either end by relatively sloping straight side portion, the end parts of said side portions being curved away from the edge of said pressure distributor plate, said pressure distributor plate having formed therein recesses complementary in shape to said curved end parts and receiving said end parts therein, the edge of the pressure distributor plate adjacent the straight portions of said spring in relaxed condition following generally the slope of said straight portions, the edge of said pressure distributor plate adjacent the curved center portion of the leaf spring being straight to define a free space between said curved center portion and said edge of said pressure distributor plate, said spring being constructed and arranged that when extremely stressed in the direction of said pressure distributor plate edge the center portion of said spring is straightened and said side portions are bowed, said leaf spring being formed at the transitional range between said outer portion which is curved in relaxed condition and each of said relatively sloping side portions with two lugs which straddle said pressure distributor plate.

4. The combination of claim 3 including a brake frame, the outer face of said leaf spring being reacted against a retaining member which is fixed to said brake frame, and extends parallel to the axis of rotation of a brake disc.

* * * * *